(12) United States Patent
Lukschander et al.

(10) Patent No.: US 9,005,332 B2
(45) Date of Patent: Apr. 14, 2015

(54) PROCESS FOR PRODUCING PIG IRON OR LIQUID PRIMARY STEEL PRODUCTS

(75) Inventors: Kurt Lukschander, Schwertberg (AT); Ulrike Schmidt, Leonding (AT)

(73) Assignee: Siemens Vai Metals Technologies GmbH (AT)

( * ) Notice: Subject to any disclaimer, the term of this patent is extended or adjusted under 35 U.S.C. 154(b) by 127 days.

(21) Appl. No.: 13/643,638

(22) PCT Filed: Apr. 12, 2011

(86) PCT No.: PCT/EP2011/055668
§ 371 (c)(1),
(2), (4) Date: Oct. 26, 2012

(87) PCT Pub. No.: WO2011/134780
PCT Pub. Date: Nov. 3, 2011

(65) Prior Publication Data
US 2013/0036868 A1 Feb. 14, 2013

(30) Foreign Application Priority Data
Apr. 26, 2010 (AT) .................................. A682/2010

(51) Int. Cl.
*C21B 11/00* (2006.01)
*C21B 5/06* (2006.01)
*C02F 1/20* (2006.01)
(Continued)

(52) U.S. Cl.
CPC ... *C21B 5/06* (2013.01); *C02F 1/20* (2013.01); *C02F 2101/322* (2013.01); *C02F 2103/16* (2013.01); *C02F 2103/18* (2013.01); *C02F 2303/10* (2013.01); *C10K 1/10* (2013.01)

(58) Field of Classification Search
CPC .............. C02F 1/20; C01K 1/10; C22B 11/00
USPC ............................ 75/503, 507; 210/749, 806
See application file for complete search history.

(56) References Cited

U.S. PATENT DOCUMENTS 4,065,294 A * 12/1977 Barker ............................ 75/748
5,225,086 A * 7/1993 Vuletic .......................... 210/712
(Continued)

FOREIGN PATENT DOCUMENTS

AT 507003 B1 3/2010 ............. B01D 45/00
CA 2797341 A1 11/2011 ................ C02F 1/00
(Continued)

OTHER PUBLICATIONS

Derwent Acc No. 2010-A10109 for the patent family including WO 2009-156238 A1 by Kang et al, published Oct. 30, 2009.*
(Continued)

Primary Examiner — George Wyszomierski
Assistant Examiner — Tima M McGuthry Banks
(74) Attorney, Agent, or Firm — Ostrolenk Faber LLP

(57) ABSTRACT

A process for producing pig iron or liquid primary steel products is provided. Charge materials containing iron ore and, if appropriate, additions are reduced in at least one reduction unit by means of a reducing gas, and at least parts thereof are smelted in a smelting unit, with coal being added and with formation of the reducing gas. Reducing gas from the smelting unit and/or top gas from the reduction unit are/is subjected to cleaning. The process water obtained during the wet cleaning is degassed and in the process volatile organic compounds are removed from the process water.

8 Claims, 1 Drawing Sheet

(51) Int. Cl.
*C10K 1/10* (2006.01)
*C02F 101/32* (2006.01)
*C02F 103/16* (2006.01)
*C02F 103/18* (2006.01)

(56) References Cited

U.S. PATENT DOCUMENTS

| | | | | |
|---|---|---|---|---|
| 5,273,572 A | * | 12/1993 | Baker et al. | 95/48 |
| 5,279,646 A | * | 1/1994 | Schwab | 95/201 |
| 6,120,582 A | | 9/2000 | Vuletic | 95/177 |
| 8,496,729 B2 | * | 7/2013 | Kang et al. | 75/468 |
| 2010/0043599 A1 | * | 2/2010 | Hauzenberger et al. | 75/573 |
| 2011/0146485 A1 | | 6/2011 | Kang et al. | 95/22 |
| 2011/0285067 A1 | * | 11/2011 | Vuletic | 266/99 |

FOREIGN PATENT DOCUMENTS

| | | | |
|---|---|---|---|
| CN | 1218444 | 6/1999 | |
| CN | 1245146 | 2/2000 | |
| DE | 2315768 A1 | 10/1974 | B01D 47/00 |
| DE | 4032288 A1 | 4/1992 | B01D 47/00 |
| DE | 19620310 A1 | 11/1997 | B01D 53/14 |
| GB | 719757 A | 12/1954 | B01D 50/00 |
| GB | 1401384 A * | 7/1975 | |
| WO | 2011/134780 A1 | 11/2011 | C02F 1/00 |

OTHER PUBLICATIONS

International Search Report and Written Opinion, Application No. PCT/EP2011/055668, 10 pages, Jul. 18, 2011.
Chinese Office Action dated Aug. 28, 2014 issued in Chinese Application No. 201180020552.3 with an English translation.

* cited by examiner

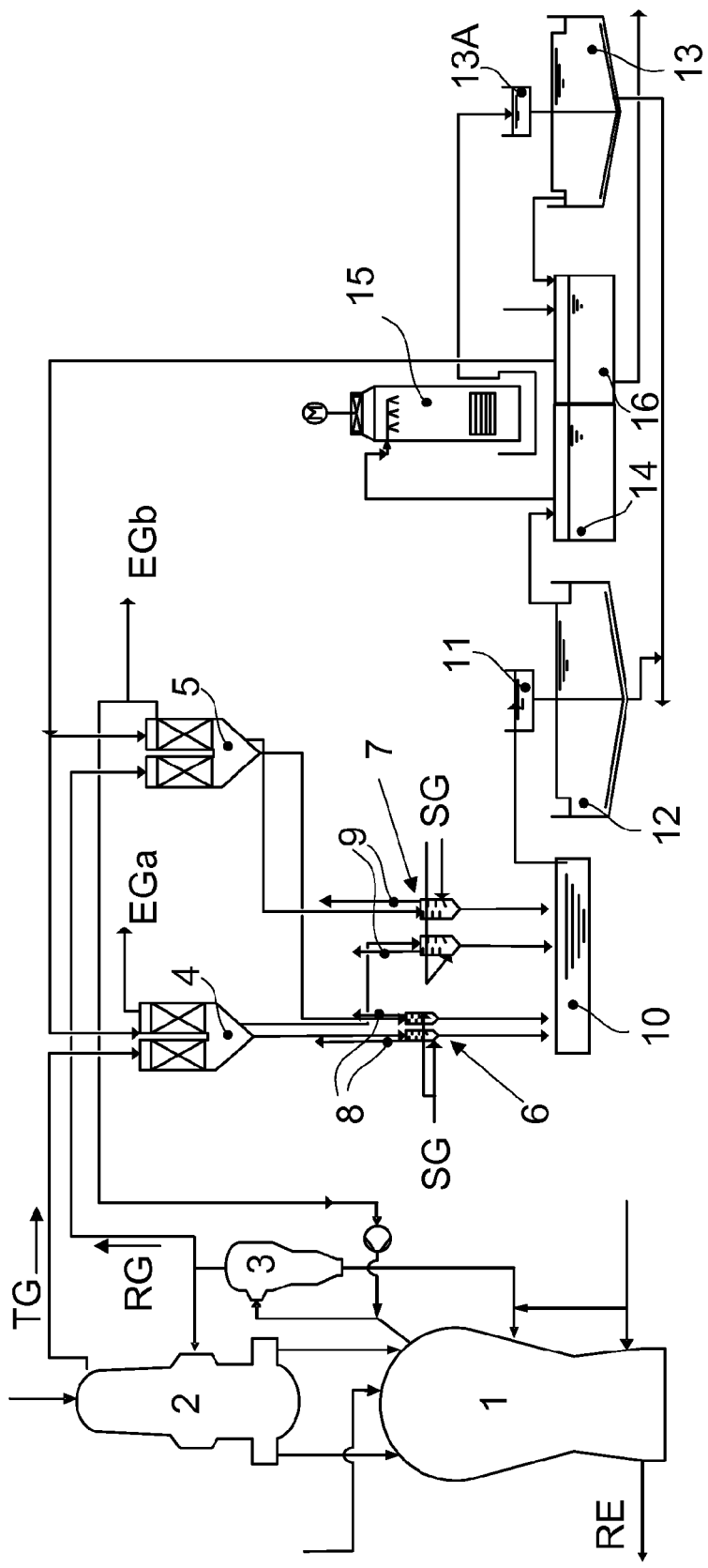

PROCESS FOR PRODUCING PIG IRON OR LIQUID PRIMARY STEEL PRODUCTS

CROSS-REFERENCE TO RELATED APPLICATIONS

This application is a U.S. National Stage Application of International Application No. PCT/EP2011/055668 filed Apr. 12, 2011, which designates the United States of America, and claims priority to AT Patent Application No. A682/2010 filed Apr. 26, 2010. The contents of which are hereby incorporated by reference in their entirety.

TECHNICAL FIELD

The disclosure relates to a process for producing pig iron or liquid primary steel products, wherein charge materials containing iron ore and, if appropriate, additions are at least partially reduced in at least one reduction unit by means of a reducing gas, and at least parts thereof are smelted in a smelting unit, in particular a melter gasifier, with solid or gaseous carbon carriers, in particular coal, and oxygen-containing gas being fed in, with simultaneous formation of the reducing gas, and the reducing gas from the smelting unit and/or top gas from the reduction unit are/is subjected to cleaning.

BACKGROUND

Complex volatile organic compounds (VOC) are formed during the production of pig iron in the smelting unit on account of the gasification of coal and of further charge materials. Even at high process temperatures, as arise for example in the dome of a smelting unit for producing pig iron, these compounds cannot be decomposed completely or cannot be decomposed in all operating states.

The operation of a smelting unit may form compounds, for example benzene-toluene-xylene (BTX), carbon monoxide, polycyclic aromatic hydrocarbons (PAH) but also cyanides ($CN^-$), which have highly toxic properties. Together with the reducing gas, these compounds pass into the gas cleaning devices, in which case these compounds accumulate, for example, in the water from wet cleaning. Furthermore, these compounds are found in all process gases, for example in the top gas which is removed from the reduction unit. If the contaminated liquid from the wet cleaning, known as process water, is fed into a cooling tower, the evaporation of the process water and of the VOC present therein in the cooling tower may result in considerable environmental pollution.

SUMMARY

In one embodiment, a process is provided for producing pig iron or liquid primary steel products, wherein charge materials containing iron ore and, if appropriate, additions are at least partially reduced in at least one reduction unit by means of a reducing gas, and at least parts thereof are smelted in a smelting unit, in particular a melter gasifier, with solid or gaseous carbon carriers, in particular coal, and oxygen-containing gas being fed in, with simultaneous formation of the reducing gas, and the reducing gas from the smelting unit and/or top gas from the reduction unit are/is subjected to cleaning, wherein the cleaning, if appropriate after dry cleaning, comprises wet cleaning, wherein the process water obtained during the wet cleaning is subjected to degassing and gases bound in the process water, in particular volatile organic compounds, are removed from the process water.

In a further embodiment, the degassing is effected in one or more degassing devices, in particular connected in parallel. In a further embodiment, the process water is additionally purged with purge gases, in particular with air, during the degassing. In a further embodiment, the gases removed during the degassing are combusted and the waste heat is utilized, in particular for coal and/or ore drying. In a further embodiment, the gases removed during the degassing are separated in a waste-air filter, in particular an activated carbon filter. In a further embodiment, further process gases are fed for the dry cleaning and/or the wet cleaning.

BRIEF DESCRIPTION OF THE DRAWINGS

Example embodiments will be explained in more detail below with reference to figures, in which:

FIG. 1: shows a process diagram for a direct reduction smelting process according to an example embodiment.

DETAILED DESCRIPTION

According to some embodiments, VOC dissolved in the process water are removed by subjecting the process water to a degassing treatment. Subsequently, the hot and thus degassed process water obtained by the wet cleaning can be evaporated without any problems in a cooling tower and can be cooled in the process, without instances of environmental pollution arising as a result of toxic compounds (VOC). Depending on the nature and dust loading or particles which are present in the reducing gas or top gas, it may be expedient to provide for dry cleaning, for example a cyclone, before the wet cleaning. In addition, enrichment of the process water with VOC is avoided, and therefore there are also no instances of pollution whatsoever for the plants themselves or the environment of the plant.

According to one embodiment of the process, the degassing is effected in one or more degassing devices, in particular connected in parallel. The degassing devices can be realized as degassing pots, for example, in which case the process volume of the individual degassing stages can be selected in line with requirements. A possible alternative can be obtained by arranging the degassing devices in series, with that degassing device which has the greatest process volume being present as the first degassing device; the subsequent stage or stages can be implemented accordingly with a smaller process volume.

According to a further embodiment, the process water is additionally purged with purge gases, in particular with air, during the degassing. Purging with air obtains better degassing, and therefore smaller process volumes or else a smaller number of degassing devices are possible.

According to one embodiment, the gases removed during the degassing are combusted and the waste heat is utilized, in particular for coal and/or ore drying. The combustion firstly breaks the toxic compounds up and therefore converts them into nontoxic compounds, and in addition the waste heat which is formed in the process can be utilized for the pig iron production process or for process steps for preparing the charge materials.

One embodiment provides that the gases removed during the degassing are separated in a waste-air filter, in particular an activated carbon filter. In the presence of particularly toxic compounds or given particularly high restrictions concerning the emissions released by the process, it may be necessary to provide an additional measure, specifically filtering of the removed off-gases. In addition, it is also conceivable to use combustion or thermal decomposition of the removed gases in combination with a waste-air filter, in which case extremely high environmental standards can also be observed.

In one embodiment, further process gases are fed for the dry cleaning and/or the wet cleaning. In the process for producing pig iron or liquid primary steel products, process gases may be contaminated by VOC and subsequently process water may be contaminated. Wet cleaning processes are used in principle for cleaning process gases laden with dust or else particles. In addition to the reducing gas produced in the smelting unit, which is also referred to as generator gas, the reducing gas may also be contaminated with VOC in the reduction unit. This gas is removed from the reduction unit as top gas after the reduction work and has to be cleaned for further utilization. In this case, VOC may likewise accumulate in the process water. Further contaminated process waters can form during the treatment of circulation gases, cooling gases, etc. Similarly, it is conceivable to also include process waters from process steps upstream or downstream of the pig iron production in the degassing, and accordingly to treat these process waters as disclosed herein.

FIG. 1 shows the process diagram for a possible configuration of the process according to an example embodiment. Process gases, such as excess reducing gas RG or else top gas TG, which have to be cleaned are produced in a plant for producing pig iron. Reducing gas is formed in a melter gasifier 1 with solid or gaseous carbon carriers, for example coal or coke, and oxygen-containing gas being fed in. Charge materials containing iron ore and, if appropriate, additions which have previously been reduced at least partially in a reduction unit 2 are introduced into the melter gasifier 1, where they are melted to form pig iron RE. The reducing gas RG formed in the melter gasifier 1 and, if appropriate, further process gases, for example top gas TG removed at the reduction unit 2 or else circulation gases (not shown here), are subjected to cleaning for further use, in which case solids, particles but also dusts are removed, for example. This cleaning can proceed in one or two stages, where use can be made, for example, of a first cleaning stage 3, for example a cyclone, followed by wet cleaning. It is also possible, however, to provide only one cleaning stage in the form of wet cleaning. The wet cleaner used is at least one gas scrubber 4, 5, the contaminants being flushed out with the process water, with the pollutants, for example volatile organic compounds (VOC), passing into the process water. A gas scrubber 4 may be used for top gas TG and a further gas scrubber 5 can be used for reducing gas RG.

Process water is drained from the gas scrubber 4, 5 and fed to degassing devices 6, 7. A discharge sited at the bottom, the so-called cone discharge, and a discharge sited further toward the top, the so-called weir discharge, are provided for each gas scrubber. Primarily relatively coarse contaminants arise in the cone discharge and relatively fine contaminants arise in the weir discharge. On account of the relatively large quantities of process water which arise at the weir discharges, the degassing devices 7 are provided for a relatively large volume of process gas. The cone discharges are routed toward the smaller degassing devices 6.

The cleaned top gas TG can be discharged from the scrubber 4 as export gas EGa, and analogously thereto the cleaned reducing gas RG is likewise discharged from the scrubber 5 as export gas EGb.

In the degassing devices 6, 7, the pollutants are flushed out of the process water with a reduction in pressure and with addition of a purge gas SG, for example air, and are discharged as a stream of waste air by means of pollutant lines 8, 9.

The cleaned process water is firstly introduced into a collection tank 10 and, to calm the flow, is introduced into an inlet region 11 and from there into a first settling tank 12 and cleaned, with slurry being separated. Then, the process water is firstly fed into a hot water tank 14, cooled in a cooling tower 15, optionally fed to a further inlet region 13A and to a further settling tank 13 and then collected in the cold water tank 16. From the cold water tank, the circulation process water can be fed in turn to the gas scrubber or scrubbers 4, 5.

The settling tanks 12, 13 can be arranged in parallel upstream of the cooling tower 15 or else in series upstream and downstream of the cooling tower 15.

The stream of waste air containing the pollutants removed from the process water (VOC, air, further purge gases) can be fed via the pollutant lines 8, 9 to a device for the further treatment of these gaseous pollutants. In this respect, it is also possible to combust these gases directly, if appropriate with the addition of air or oxygen-containing gases, for producing energy, in which case toxic pollutants can also be decomposed. Furthermore, it is also conceivable to mix the stream of waste air with further combustible gases, in particular with combustible process gases, and to combust the mixture. The combustible gas can also be stored, however, and used as an energy source. In particular, the waste heat produced during the combustion is utilized in the process for producing pig iron or liquid primary steel products. The waste heat can possibly be utilized for coal and/or ore drying.

LIST OF REFERENCE SYMBOLS

1 Smelting unit
2 Reduction unit
3 First cleaning stage
4, 5 Gas scrubber
6, 7 Degassing device
8, 9 Pollutant lines
10 Collection tank
11 Feed tank
12 Settling tank
13A Further feed tank
13 Further settling tank
14 Hot water tank
15 Cooling tower
16 Cold water tank

What is claimed is:
1. A process for producing pig iron or liquid primary steel products, comprising:
   at least partially reducing charge materials comprising iron ore in at least one reduction unit using a reducing gas,
   smelting at least parts of the at least partially reduced charge materials in a smelting unit using solid or gaseous carbon carriers and oxygen-containing gas, wherein the smelting process forms reducing gas for use in the at least one reduction unit,
   cleaning the reducing gas from the smelting unit, wherein the cleaning comprises dry cleaning followed by wet cleaning,
   degassing process water obtained during the wet cleaning by pressure reduction and addition of purge gases to obtain bound gases from the process water,
   removing the bound gases, and
   combusting the bound gases with air or another oxygen-containing gas to decompose toxic pollutants.
2. The process of claim 1, wherein the degassing is performed in a plurality of degassing devices connected in parallel.

3. The process of claim 1, wherein the combusting generates heat and the generated heat is utilized for coal and/or ore drying.

4. The process of claim 1, wherein the gases removed during the degassing are separated in a waste-air filter.

5. The process of claim 1, wherein further process gases are provided for the wet cleaning.

6. The process of claim 1, wherein the solid or gaseous carbon carriers used in the smelting process comprise coal.

7. The process of claim 1, wherein top gas from the reduction unit is cleaned along with the reducing gas.

8. The process of claim 1, wherein removing bound gases from the process water comprises removing volatile organic compounds from the process water.

* * * * *